Patented Sept. 23, 1941

2,256,544

UNITED STATES PATENT OFFICE 2,256,544

MANUFACTURE OF SALTS OF ALKYL ACRYLIC ACIDS

Joseph E. Bludworth, Cumberland, Md., assignor to Celanese Corporation of America, a corporation of Delaware No Drawing. Application January 11, 1938, Serial No. 184,395

4 Claims. (Cl. 260—530)

This invention relates to the production of synthetic resins from unsaturated alcohols, such as allyl alcohols, by first converting the alcohols to alkyl esters or salts of acrylic acids.

An object of this invention is the production of alkyl-acrylic esters from allyl alcohols. Another object of the invention is the production of alkyl-acrylic esters from allyl alcohols wherein the yield is better than 85% of the allyl compound used. A still further object of the invention is the economic and expeditious production of synthetic resins of the acrylic ester type from allyl alcohols. Other objects of the invention will appear from the following detailed description.

In the petroleum and coal conversion industries there is produced a considerable quantity of unsaturated alcohols, an outstanding example of which is methallyl alcohol or unsaturated isobutyl alcohol. These alcohols may be polymerized to form synthetic resins. However, there is a greater demand for synthetic resins formed by polymerizing the organic esters of acrylic acids. Attempts, therefore, have been made to convert the allyl alcohols to alkyl-acrylic esters which attempts resulted in poor yields or were otherwise uneconomical. By employing this invention, more than 90% of the allyl alcohol is converted to alkyl-acrylic esters and in the conversion of methylallyl alcohol to methyl methacrylate the yield is approximately 95% or better. By employing this invention, the alkyl-acrylic esters are formed in a pure state and they are not contaminated with side reaction products. The purity of the alkyl-acrylic ester obtained makes it well suited for the production of sheet material to be used as a substitute for glass in aeroplanes, in safety glass and like uses where exceptionally clear, homogeneous sheet material is required.

In accordance with my invention, I convert allyl alcohols to alkyl-acrylic esters and then polymerize the said esters to form synthetic resins. The conversion is accomplished by oxidizing the allyl alcohol and then treating the resulting product first with a high concentration of an alkali and then with an alkyl inorganic acid ester. After filtering to remove the inorganic salt formed during the conversion, the alkyl-acrylic ester may be polymerized to form a synthetic resin by the application thereto of suitable polymerization catalysts such as light, ultra-violet rays, heat, benzoyl peroxide, etc. or combinations of these.

This invention is applicable to the conversion and production of alkyl-acrylic type resins from any allyl alcohol. Examples of suitable allyl alcohols are methylallyl alcohol, ethylallyl alcohol, crotonyl alcohol and methyl crotonyl alcohol. The crotonyl compounds may be either the cis- or trans-crotonyl compounds. The alkyl groups that may be joined with the allyl compound to form the alkyl-acrylic ester may be any suitable alkyl group such as methyl, ethyl, propyl, butyl, etc.

Although this invention is applicable to the production of alkyl-acrylic type resins from any suitable allyl alcohol, it will be described with particular reference to the production of methyl methacrylate resins from methylallyl alcohol as this is the compound most commonly met with in the commercial field. Methylallyl alcohol is vaporized and mixed with air or oxygen and passed through a vitreous or metallic tube containing copper turnings or other oxidation catalysts. The tube is preferably heated to from 500° to 1000° F. and may be operated at atmospheric or higher pressures. A preferred condition of the tube is 750° F. and 5 pounds gauge pressure. Nitrogen, steam or other diluents may be used in the reacting mixture of vaporized methylallyl alcohol and oxygen to lessen the violence of the reaction. For instance, from 1 to 10 parts by volume of steam may be employed for each part of vaporized methyl alcohol. The oxidation products, mainly methacrolein, may be condensed by cooling as they leave the reaction zone and separated from the unreacted gas. The unoxidized alcohol may be returned to the reaction zone. The total conversion to methacrolein per passage through the reaction is about 48%, and the conversion effected by recycling the unoxidized alcohol to the reaction zone is approximately 95%. In this conversion 8 pounds of methylallyl alcohol and 1.78 pounds of oxygen supplied as air yield 7.4 pounds of methacrolein.

The methacrolein formed in the above reaction is treated with a strong aqueous or alcoholic solution of sodium or potassium hydroxide. The mixture of the two liquids is stirred while being heated to between 150° to 212° F., preferably under reflux to accelerate the reaction. The methacrolein is condensed under the influence of the alkali to methallyl methacrylate which is quickly saponified by the alkali to methallyl alcohol and the alkali salt of methacrylic acid. The yields are quantitative. For instance, 7.4 pounds of methacrolein yield 3.8 pounds methallyl alcohol and 5.7 pounds of sodium methacrylate when 2.5 pounds of sodium are used. The 3.8 pounds of methallyl alcohol may be returned to the first reaction.

The sodium salt obtained from the above reaction is reacted with methyl chloride, dimethyl sulphate or other like alkyl esters of inorganic acids to give the alkyl methacrylate or methacrylic acid and an inorganic salt. Other alkyl esters may be employed, such as diethyl sulphate, ethyl chloride, etc., which obviously will result in a different product. The reaction is preferably carried out with the salt in solution and with agitation of the mixture. The reaction is aided by heating and may be carried out under pressure, particularly if methyl chloride or other volatile reagents are used. When dimethyl sulphate is used as a methylating agent, the mixture may be heated until the dimethyl sulphate refluxes at atmospheric pressure. However, if methyl chloride is used pressure must be maintained in the reaction vessel if a temperature of 150° F. is to be reached. The yield is about 95% or better of the theoretical. For instance, 5.7 pounds of sodium methacrylate and 3.3 pounds of dimethyl sulphate yield 5 pounds of methyl methacrylate.

The alkyl-acrylic compound derived from an allyl alcohol as above described, may be polymerized in any suitable manner and during the polymerization may be shaped to form any suitable articles such as sheets, films, filaments, rods, tubes and shaped articles. This may be accomplished by partially polymerizing the alkyl-acrylic monomer until it becomes a viscous liquid and then pouring this viscous liquid into molds, casting it upon casting wheels or plates, extruding it through suitable orifices, or injecting it into molds with the aid of injection molding devices. As an aid in preventing the formation of bubbles during the polymerization, it is advisable first to form a polymer and then finely divide this, add it to a monomer, and then effect the final polymerization and shaping operation of this mixture. Any suitable effect materials may be added to the mixture or to one of the constituents thereof prior to the final setting-up or solidifying of the polymer.

It is to be understood that the foregoing detailed description is merely given by way of illustration and that many variations may be made therein without departing from the spirit of my invention.

Having described my invention, what I desire to secure by Letters Patent is:

1. Process for the manufacture of alkali metal salts of alkyl-acrylic acids comprising heating an alkyl-acrolein with a strong solution of alkali metal hydroxide to form the alkali metal salt of the alkyl-acrylic acid.

2. Process for the manufacture of alkali metal salts of alkyl-acrylic acids comprising heating at a temperature of 150 to 212° F. an alkyl-acrolein with a strong solution of alkali metal hydroxide so that condensation of the acrolein to the alkyl-allyl ester of the alkyl-acrylic acid occurs which ester is saponified by the alkali metal hydroxide present to form the corresponding alkali metal salt.

3. Process for the manufacture of alkali metal salts of methacrylic acid comprising heating methacrolein with a strong solution of alkali metal hydroxide to form the alkali metal salt of methacrylic acid.

4. Process for the manufacture of alkali metal salts of methacrylic acid comprising heating methacrolein at a temperature of 150 to 212° F with a strong solution of alkali metal hydroxide so that condensation of the aldehyde to the methallyl ester of methacrylic acid occurs which ester is saponified by the alkali metal hydroxide present to form the corresponding alkali metal salt.

JOSEPH E. BLUDWORTH.